(12) United States Patent
Yan

(10) Patent No.: US 10,354,540 B2
(45) Date of Patent: Jul. 16, 2019

(54) METHOD FOR GENERATING A DEDICATED FORMAT FILE FOR A PANORAMA MODE TEACHING SYSTEM

(71) Applicant: Jian Yan, Beijing (CN)

(72) Inventor: Jian Yan, Beijing (CN)

(73) Assignee: Jian Yan (CN)

(*) Notice: Subject to any disclaimer, the term of this patent is extended or adjusted under 35 U.S.C. 154(b) by 592 days.

(21) Appl. No.: 14/771,370

(22) PCT Filed: Feb. 20, 2014

(86) PCT No.: PCT/CN2014/000167
§ 371 (c)(1),
(2) Date: Aug. 28, 2015

(87) PCT Pub. No.: WO2015/085644
PCT Pub. Date: Jun. 18, 2015

(65) Prior Publication Data
US 2016/0240094 A1 Aug. 18, 2016

(30) Foreign Application Priority Data
Dec. 11, 2013 (CN) .......................... 2013 1 0666363

(51) Int. Cl.
*G09B 5/10* (2006.01)
*G09B 5/06* (2006.01)
(Continued)

(52) U.S. Cl.
CPC ................. *G09B 5/10* (2013.01); *G09B 5/00* (2013.01); *G09B 5/065* (2013.01); *G09B 19/00* (2013.01); *H04L 65/60* (2013.01)

(58) Field of Classification Search
CPC .......... G09B 19/00; G09B 5/00; G09B 5/065; G09B 5/10; H04L 65/60
(Continued)

(56) References Cited

U.S. PATENT DOCUMENTS

2005/0165795 A1* 7/2005 Myka ................. G06Q 10/1095
2010/0153836 A1* 6/2010 Krassner ................. H04L 67/36
715/234

(Continued)

FOREIGN PATENT DOCUMENTS

CN 1402482 A * 3/2003
CN 101316356 B * 12/2010
(Continued)

OTHER PUBLICATIONS

International Search Report, PCT/CN2014/000167, dated Sep. 24, 2014, 5 pages, with English Translation.

*Primary Examiner* — Eddy Saint-Vil
(74) *Attorney, Agent, or Firm* — Tarolli, Sundheim, Covell & Tummino LLP

(57) ABSTRACT

The invention relates to a method for generating a dedicated format file for a panorama mode teaching system. By using the method of the invention, the size of the generated format file is small and recording and interaction process is convenient. The method is suitable for digitalized teaching and remote teaching. A traditional remote teaching process is lack of interactions and depends on a high quality network. By using the method of the invention, the above problems are solved. A reliable technology support is provided for teaching resource equalization.

1 Claim, 2 Drawing Sheets

(51) Int. Cl.
*H04L 29/06* (2006.01)
*G09B 5/00* (2006.01)
*G09B 19/00* (2006.01)

(58) Field of Classification Search
USPC .......................................................... 434/365
See application file for complete search history.

(56) References Cited

U.S. PATENT DOCUMENTS

2011/0209075 A1* 8/2011 Wan .................. G06F 17/30905
715/760
2012/0005623 A1* 1/2012 Ishak .................... G06F 3/0485
715/786

FOREIGN PATENT DOCUMENTS

| CN | 102739808 A | 10/2012 |
| CN | 102882985 A | 1/2013 |
| EP | 0765062 B1 | 11/2005 |
| WO | WO 2015/085664 | 6/2005 |

\* cited by examiner

| Action Type | Path Portion | Data Portion |
|---|---|---|
| Stroke-type | Stroke path | None |
| Media-type | Coordinates where media occurs | Physical address of media file |
| Data-type | Coordinates where data are used | Data content in binary format |

| File header | Action Data Sequence |
|---|---|

Fig. 3

| Digital Signature | Version Number | The number of Action Sequences | Course Identification Number | Course Path |
|---|---|---|---|---|

Fig. 4

| Type | Generation Time | Length N of Additional Data | Additional Data N | Path Log | Path Sequences |
|---|---|---|---|---|---|

Fig. 5

METHOD FOR GENERATING A DEDICATED FORMAT FILE FOR A PANORAMA MODE TEACHING SYSTEM

CROSS-REFERENCE TO RELATED APPLICATIONS

This application is an U.S. national stage of PCT/CN2014/000167, filed on Feb. 20, 2014, which claims priority to Chinese Patent Application No. 201310666363.4, filed on Dec. 11, 2013, the contents of which are each incorporated herein by reference in its entirety.

FIELD OF THE DISCLOSURE

The present disclosure relates to a method for generating a dedicated format file, and more particularly, to a method for generating a dedicated format file for a panorama mode teaching system. The format file generated by the present invention has a small size and thus facilitates recording and interactivity. Thereby, it is suitable for digitalized teaching and remote teaching.

BACKGROUND

With the development of information technology, more and more people learn latest knowledge from the internet, and thus online learning has been a new way of enriching their knowledge. Current online learning system mainly relies on two ways of video teaching and simple text teaching. Since interactivity isn't implemented during the courses recorded by video, information only spreads in one way during teaching. Furthermore, the students' attention is easily detracted due to distance between the students and the played contents, causing the students not interested. In addition, the size of the video file is large resulting in that playing is not smooth in rush hour of the internet, especially, in the remote areas. Accordingly, the effect of the video teaching is not good. Meanwhile, the simple text teaching is too monotonous and is not suitable for primary and secondary school children.

SUMMARY

In order to address the deficiencies in the existing teaching methodology, the present invention provides a method for generating a dedicated format file for a panorama mode teaching system.

The technical solution in the present invention is as follows. A method for generating a dedicated format file for a panorama mode teaching system which comprises a panoramic courseware making system for obtaining a teacher's or a student's actions, voices, curriculum documents and time when these data are obtained, wherein the actions comprise insertion of texts or pictures, demonstration of experimental procedures, drawing of lines and geometric shapes, movement of eraser tools or small blackboard tools, the method is characterized by: obtaining the teacher's or the student's instant voices by the teaching system via a microphone, while collecting the teacher's or the student's actions via a mouse, a keyboard, a tablet, or an electronic whiteboard; analyzing the actions to obtain the time when the actions happen, paths of the actions, additional data carried by the actions and types of the actions; recording the time when the actions happen, the paths of the actions, the additional data carried by the actions and the types of the actions in an order of time, wherein the actions include stroke actions, media actions, and data actions and each of them comprises two portions: path portion and data portion; for a stroke action, the sequence of physical coordinates of the action path is completely recorded in the path portion and the data portion is not enabled; for a media action, the coordinates where the multimedia file appears in the courseware is recorded in the path portion and the physical address of the multimedia file is recorded in the data portion; for a data action, the coordinates used by the data in the courseware is recorded in the path portion and a complete binary data stream of the file is written into the data portion. The stroke actions include a writing path, a moving path by a teaching pole and a wiping path by an eraser. The media actions include insertion of pictures or videos. The data actions include direct a picture fully integrated with the standard courseware, rather than referenced by the physical address.

The teacher's and the student's voices are recorded using the moment the voices occur as a reference, wherein all the actions that happened during explanation and interactivity (including but not limited to, drawing graphics, inserting text, explaining the lectures, inserting multimedia data, carrying out graphic virtual experiments, questioning and answering) are recorded correspondingly. And the voices and the corresponding actions are stored or processed in accordance with specific rules, forming a dedicated file or live data stream for interactive teaching process in order to implement remote live or reproduction of the interactive teaching.

According to the present invention, the whole process of the panoramic teaching and interactivity is clearly classified and is processed according to the different categorization. The physical path (such as the movement path of the chalk, the movement path of the teaching pole) generated by the actions and the additional data (including pictures, multimedia, text, binary content, etc.) are recorded according to the time when the actions happen so that the recording of the whole process can be accurate up-to-the second.

At the time of live broadcast, the acquired data stream including the actions is analyzed in order to obtain the types of the actions, the physical paths and the additional data of the actions, which are synchronously played with the voices. Thus, all the actions and interactivity are presented panoramically in the distal site.

During playback, the saved recording is performed on the data analysis in order to obtain the types of the actions, physical paths and additional data of actions and the time when the actions happen, all of which will match the voices based on the timing. Thus, this explanation process will be fully synchronized and panoramically presented with all of the actions including interactivity.

The main way in which the students gain knowledge is to listen to the explanation and watch the explanation process in detail. The present invention is to seize these two points. The explanation voices are recorded by way of technical means, and the explanation process is simultaneously recorded. They are saved in a dedicated data structure and then can be synchronized playback for the students to enable the students to acquire the most effective teaching information. Meanwhile, the dedicated format file generated has a very small size. For the same course, the size of the formed file according to the present invention is only $1/10 \sim 1/6$ than that of the video file.

The recording file for the panorama mode teaching process according to the present invention has a small size and provides an interactive function. Thus, the panorama and interactive teaching between the teacher and students can be easily broadcast in the internet. The lack of interaction with traditional remote teaching process and the requirements for high-quality network can be solved and a reliable technical support for balanced teaching resources is provided.

BRIEF DESCRIPTION OF THE DRAWINGS

FIG. 3 shows a basic structure of the action recording file.

FIG. 4 shows a basic structure of the file header of the action recording file.

FIG. 5 shows a basic structure of one block in an action data sequence of the action recording file.

DETAILED DESCRIPTION

Figures 1, 2:
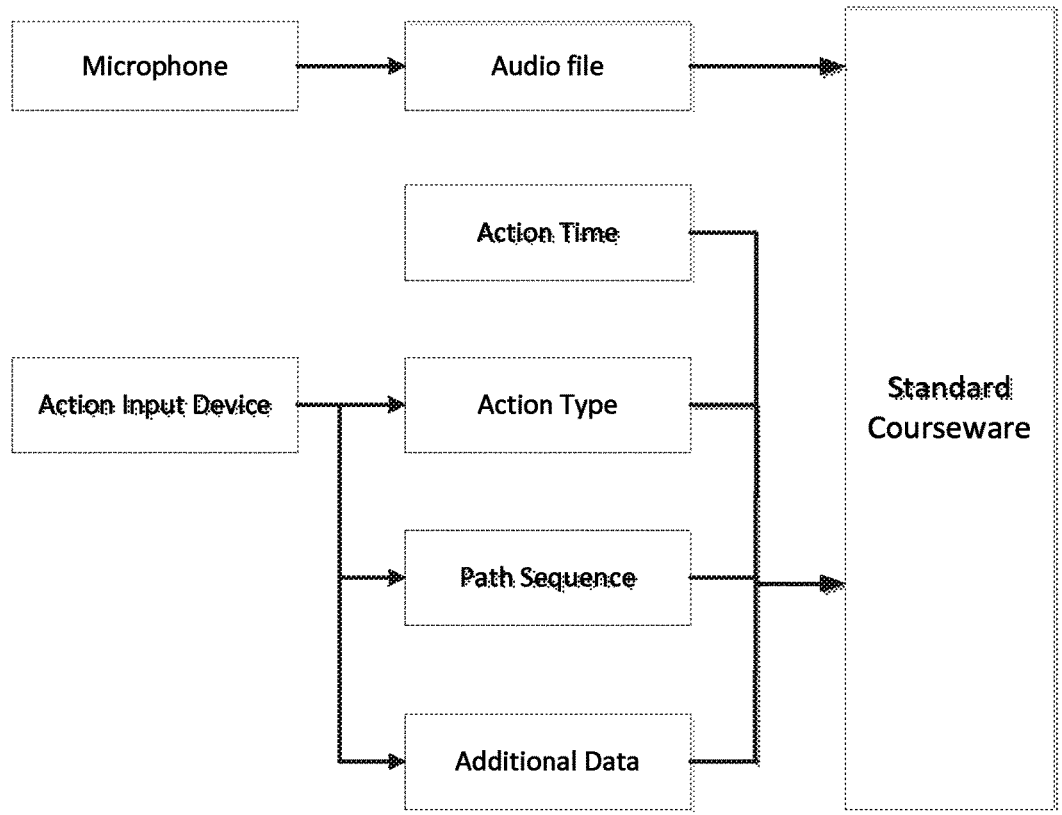
FIG. 1 shows a flowchart of generating a standard courseware and the components thereof
FIG. 2 shows types of the actions and the structure thereof.

The embodiments of the present disclosure will be described below in combination of the accompany drawings.

FIG. 1 presents a flowchart of generating a standard courseware and the components thereof according to the present invention. The instant voices of teaching and/or interactivity are obtained by the system via a microphone, and at the same time the current explanation and/or interactive actions are obtained by the system via an action acquisition device (for example, a mouse, a keyboard, a tablet, an electronic whiteboard etc.). Further, the data of the actions are analyzed and thus the time of generating the corresponding actions, the explanation paths carried by the actions, the additional data carried by the actions (including images, multimedia, texts, binary contents, etc.) and the types of the actions are obtained and recorded by a specific structure one by one. When the class is completed, the computer system compresses the action data generated in the class and makes them combined with the voices to form a standard courseware. Thus, all the proceedings involved by the teacher and interactivities are recorded.

FIG. 2 depicts the definitions of the types of the explanation actions and data processing rules. If the explanation action is a stroke action, such as a chalk handwriting, a teaching pole movement, an eraser movement, etc., the path portion is used to completely record a serial of the physical coordinates of the teacher's action path (such as a chalk handwriting path, the path of the teaching pole movement, the path of the eraser movement) and the data portion is not enabled. If the action is a media action (such as insertion of pictures, videos, etc.), the path portion is used to completely record the coordinates where the multimedia file appears in the courseware, and the data portion is used to record the physical address of the multimedia file. If the action is a data action (such as a picture fully integrated with the standard courseware, rather than referenced by the physical address, the path portion is used to completely record the coordinates where the data appear in the courseware and a complete binary data stream of the file is written into the data portion. In this design, the standard courseware can cover all situations that may occur, so that the system can support richer extensions in the future.

FIG. 3 shows the basic structure of the action recording file of the standard courseware in the present invention, which consists of the standard courseware header and the action data sequence.

FIG. 4 shows the basic structure of the file header of the action recording file of standard courseware. Digital signature is used to identify the legitimacy of this courseware. The version number is used by the software system when the courseware is generated so that the different data are processed depending on the corresponding version during the play and the version is compatible with demand. In addition, the file header records the number of action sequences contained in this courseware, as well as a unique identification code of the courseware and the physical path of using the courseware files (such as PPT, etc.). With rich functionality, more and more contents can be recorded in the file header.

FIG. 5 shows the contents of one standard action block of the action data sequence of the action recording file in the standard courseware. In the block, the types of the action, the time when generated, additional data N and the length of additional data carried by the action (N=1, 2, 3, 4, 5 . . . ), logarithm of the path generated by the action (because the coordinates are in pairs) and the path sequence are recorded.

The invention claimed is:

1. A method for generating a dedicated format file for a panoramic mode teaching system comprising a panoramic courseware making system, the method comprising:

the panoramic courseware making system acquiring data including a teacher's and/or a student's actions, voices, curriculum documents, and time information corresponding to the moment when the data are acquired, wherein the actions comprise
insertion of texts or pictures,
demonstration of experimental procedures,
drawing of lines and/or geometric shapes, and/or
movement of eraser tools or small blackboard tools;
obtaining instant voices of the teacher and/or the student by the teaching system via a microphone, while collecting the actions via a mouse, a keyboard, a tablet or an electronic whiteboard;
analyzing the actions to obtain
the time when each action happens,
paths of the actions,
additional data carried by the actions, and
types of the actions;
recording the time when the actions happen, the paths of the actions, the additional data carried by the actions, and the types of the actions in an order of time,
wherein the actions include stroke actions, media actions, and data actions,
wherein the stroke actions comprise a writing path, a moving path by a teaching pole and a wiping path by an eraser,
wherein the media actions comprise insertion of pictures or videos,
wherein the data actions comprise a picture fully integrated with the panoramic courseware, rather than referenced by a physical address, and
wherein each of the stroke actions, the media actions, and the data actions comprises two portions: a path portion and a data portion,
wherein, for a stroke action, the sequence of physical coordinates of the action path is completely recorded in the path portion and the data portion is not enabled,
wherein, for a media action, the coordinates where the multimedia file appears in the courseware is recorded in the path portion and a physical address of the multimedia file is recorded in the data portion, and wherein, for a data action, the coordinates used by the data in the courseware are recorded in the path portion and a complete binary data stream of the file is written into the data portion.

* * * * *